United States Patent [19]
Garshelis

[11] 4,188,572
[45] Feb. 12, 1980

[54] CURRENT SENSING DEVICE

[76] Inventor: Ivan J. Garshelis, 61 Oleander Way, Clark, N.J. 07066

[21] Appl. No.: 624,525

[22] Filed: Oct. 22, 1975

Related U.S. Application Data

[62] Division of Ser. No. 488,209, Jul. 12, 1974, Pat. No. 3,961,297.

[51] Int. Cl.² .......................................... H01H 55/00
[52] U.S. Cl. ..................................... 323/9; 340/664; 361/93
[58] Field of Search ................ 323/6, 9; 324/34 MA, 324/252; 335/3, 215; 340/248 B, 248 C, 664; 361/93

[56] References Cited
U.S. PATENT DOCUMENTS
3,083,353  3/1963  Bobeck .................. 335/215 UX

FOREIGN PATENT DOCUMENTS
45-25033  8/1970  Japan .................. 324/34 MA

*Primary Examiner*—A. D. Pellinen
*Attorney, Agent, or Firm*—Hubbell, Cohen, Stiefel & Gross

[57] ABSTRACT

Devices relying on the Inverse Wiedman Effect. Devices include a current conductive, magnetically anisotropic rod, through which an AC current flows. Wound about the rod is a conductive coil having output terminals. By varying the AC current, the anisotropy, or both, variations in the output across coil terminals can be obtained. Devices may be for current sensing, pressure sensing, fluid flow sensing or an electric push button.

5 Claims, 2 Drawing Figures

CURRENT SENSING DEVICE

This a division, of application Ser. No. 488,209 filed July 12, 1974, now U.S. Pat. No. 3,961,297.

RELATED APPLICATIONS

This invention is related to the inventions described in four applications filed by me concurrently herewith, which applications are identified as MAGNETO-ELASTIC, REMANENT HYSTERETIC DEVICES, Ser. No. 488,208 now U.S. Pat. No. 3,932,112, ELECTROMECHANICAL TRANSDUCERS, Ser. No. 488,219 now U.S. Pat. No. 3,959,751, MECHANICAL MAGNET, Ser. No. 488,841 now U.S. Pat. No. 3,939,448 and METHOD AND APPARATUS FOR CIRCULARLY MAGNETIZING A HELICAL CONDUCTIVE ROD, Ser. No. 488,220 now U.S. Pat. No. 3,927,386, the contents of all of which are hereby incorporated by reference in their entireties.

BACKGROUND OF THE INVENTION

1. Field of the Invention

This invention relates to electromagnetic anisotropic devices and particularly to such devices made out of a current conductive rod which is carrying sufficient current therethrough to reverse the direction of the helical magnetization produced by said current each half cycle. More particularly, this invention relates to such electromagnetic anisotropic devices that have a conductive coil wound around the current carrying rod for producing an output voltage in accordance with the change in axial flux linkages resulting from the change in direction of helical magnetizaton.

2. Description of the Prior Art

For many years the so-called Wiedemann Effect has been well known. The Wiedemann Effect is the twist produced in a wire that exhibits magnetostriction when that wire is placed in a longitudinal magnetic field and an electric current flows through the wire. The converse or inverse of this phenomenon has also been recognized and is commonly called the Inverse Wiedemann Effect. In the Inverse Wiedemann Effect, axial magnetization is produced in a magnetostrictive wire that carries currrent therethrough when the wire is being twisted.

There have been a number of attempts to employ the Wiedemann and Inverse Wiedemann Effect in practical applications. Such attempts are discussed at length in an article by J. A. Granath entitled "*Instrumentation Applications Of Inverse Wiedemann Effect*" which appeared in the Journal of Applied Physics, Volume 31, pp 178S-180S (May 1961), and in a publication by the International Nickel Company, Inc. of New York, New York, entitled "*Magnetostriction*". At least two United States patents disclose the devices relied upon in the Inverse Wiedemann Effect, namely U.S. Pat. No. 2,511,178 granted to H. C. Roters on June 13, 1950, and U.S. Pat. No. 3,083,353, granted to A. H. Bobeck on Mar. 26, 1963. The Roters patent is directed to devices including magnetostrictive rods that exhibit essentially a linear characteristic curve when one plots the axial magnetic induction ($B_{ax}$) versus the angle of twist ($\alpha$) of said rod. There is no suggestion in Roters of using anisotropic materials. Bobeck, on the other hand, does rely on anisotropy for producing a memory device for computers or the like. However, in the Bobeck devices the level of the current being passed through the anisotropic rod is never sufficient to cause a reversal of the direction of helical magnetization in said rod and hence is insufficient to cause a change in flux linkage with the surrounding coil to produce an output voltage.

SUMMARY OF THE INVENTION

A current carrying rod which exhibits magnetic anistropy in other than a purely circular or purely longitudinal direction has a conductive coil wound thereabout. An alternating current is passed through said rod to produce helical magnetization. The magnitude of the current is sufficiently great so that at least during a portion of the operation of the device the current is so great as to produce the helical magnetization in the rod in a given direction during one half cycle and to cause a reversal of the direction of helical mangnetization during the next half cycle, whereby to cause a change in the linkage of the axial flux in said rod with the conductive coil to thereby produce an AC output at the terminals of the conductive coil.

Such a device may be employed as a current detector or to measure a variety of other parameters such as pressure or fluid flow. Thus, for example, the current flowing through the anisotropic rod can be monitored by measuring the output voltage across the output terminals of the conductive coil wound thereabout. If such a device is incorporated as a current overload device, whereby to protect against excessive current, the anisotropic rod may be constructed so that a normal current flowing through the rod will not cause reversal of direction of the helical magnetization in the rod during each half cycle of normal current. However, when there is a current overload, the overload current will be sufficient to cause reversal of direction of helical magnetization which will cause a change in the flux linkages with the surrounding conductive coil and produce an output signal. This output signal can be employed to actuate a mechanism to open the circuit which includes the anisotropic rod such as in a circuit breaker or the like. On the other hand, the anisotropic rod can be connected in series with a welding circuit to detect the loss of current in the discontinuance of the welding operation. When this is done the anisotropy of the rod is arranged so that normal welding current will produce reversal of direction of helical magnetization within the rod during each half cycle so as to produce a steady output voltage across the output terminals of the conductive coil. However, when current ceases to flow through the rod as when the welding operation is inadvertently discontinued, there will be a loss of voltage across the output terminals of the conductive coil which is detectable and which can be employed to actuate a mechanism to restart the welding.

DETAILED DESCRIPTION OF THE PREFERRED EMBODIMENTS

In the following specification and the claims annexed hereto a material is said to exhibit "magnetic anisotropy", or anisotropy when it shows a predisposition to be magnetized in a given predetermined direction as compared with all other directions. The magnetically anisotropic materials employed in the present invention are said to be employed in "rods". As used herein a rod may be a solid device or it may be a tubular device. It might also include composite materials, such as a solid rod having a core of one material and an outer covering of another material.

Figure 1:
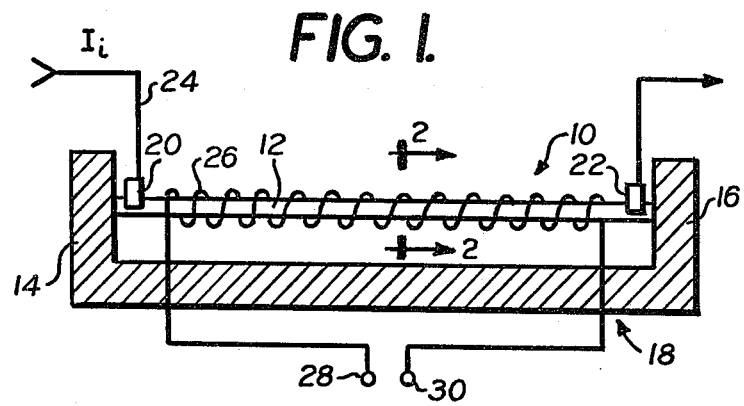
FIG. 1 is a view, partly diagrammatic, partly sectional and partly in elevation, illustrating a current detecting mechanism embodying the present invention.
Figure 2:
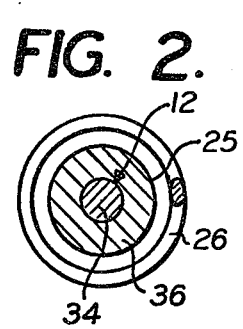
FIG. 2 is a sectional view taken along the line 2—2 of FIG. 1.

Referring now to FIGS. 1 and 2 of the drawings, a current detection mechanism 10 is illustrated. This current detection mechanism includes a rod 12 that exhibits the property of magnetic anisotropy. Although alternate means may be employed to obtain anisotropy in rod 12, as shown herein the magnetic anisotropy is achieved by twisting the rod. The amount of twist is a matter of design choice. It is preferably less than that which would exceed the elastic limit of the material in tension, usually of the order of not more than about 1° twist per centimeter of length for rods having a diameter of about 3 mm. Specifically, it will be seen that the rod 12 is mounted between the two legs 14 and 16 of a U-shaped member 18. The rod is first twisted and then is secured in its twisted condition between the legs of the U-shaped member 18 to hold it in twisted condition. This will cause the rod to exhibit magnetic anisotropy if it is made of a suitable material. A suitable material is one which will exhibit a sufficiently high anisotropy from the twist as compared with other anisotropies that might be present in the material such as, for example, from crystal lattice structure or the like. Specifically, materials such as nickel, nickel-iron alloys, cobalt nickel alloys, and cobalt-iron alloys all exhibit excellent magnetoelastic anisotropy when compared with other existing anisotropies in such materials.

Disposed near the outer ends of the rod 12 are a pair of terminals 20 and 22 for connection to a suitable current carrying line 24 to place the rod 12 in series with said line. It will be recognized that rather than having the rod 12 in series with the line being monitored, which in FIG. 1 is the line 24, an intervening device such as a current transformer or the like may be interposed between the line being monitored and the rod 12 so that a current proportional to the current being monitored will actually flow through the rod. Wound about the rod 12 is a conductive coil 26, preferably made of a good conductor such as copper wire or the like, which coil is designated by the reference numeral 26 and having output terminals 28 and 30. Clearly, with rod 12 conductive either coil 26 or rod 12 must be insulated to prevent current interaction between them. While coil 26 is shown to be overlying substantially the entire length of the rod 12, it will be recognized that it can overlie a portion only of the length, this being a matter of design choice.

It is not necessary that the coil 26 be wound directly on the rod 12. Thus, the coil 26 may be wound separately on a bobbin or the like, and then the bobbin with the coil 26 thereon may be slid over the rod 12 in order to dispose the coil 26 about the rod. Assuming the bobbin is insulating, this takes care of the insulation problem provided adjacent turns of coil 26 do not touch one another. If they do, it will be necessary to insulate the wire of coil 26, as by lacquer. In FIG. 2 the bobbin is designated by the reference character 25 and is shown snugly fit about the exterior of the rod 12. This makes the assembling of this device extremely simple as contrasted with a variety of other current detecting devices presently available which require the winding of toroidal coils on anisotropic toroidal coils. Such a winding operation is considerably more complex and more costly than the winding operation necessary to make device 10.

The device 10 may be employed as either a current overload detection mechanism as in a circuit breaker or the like, or as a device for determining that current has dropped below a certain desired level and then producing an output to initiate corrective action with respect thereto. Assuming first that the device 10 is incorporated in an overcurrent device such as a circuit breaker, the current being monitored is the current $I_1$ flowing through the line 24, and the rod 12 in series therewith. When the current $I_1$ is normal, that is below a predetermined value, the current reversals during each half cycle are insufficient to cause irreversible magnetization changes which would lead to a reversal of direction of the helical magnetization caused by the current $I_1$ flowing through the rod 12. However, when the current $I_1$ increases above a predetermined level, then the current reversals each half cycle are sufficient to cause such irreversible magnetization changes which changes result in a change of direction of the helical magnetization each half cycle. This being the case during each half cycle there will be a change (i.e., reversal of direction) in the axial component of the helical flux within the rod 12 which change in axial component will result in a change in axial flux linkages in the coil 26 ($d\phi dt$) to result in the appearance of a signal $V_o$ at the output terminals 28 and 30 of the coil 26. $V_o$ will be some form of alternating current and its existence is such as to be able to actuate suitable mechanisms (not shown) for opening contacts or the like to thereby break the circuit 24.

The device 10, as already noted, may also be employed to detect a drop of current $I_1$ below a predetermined level and then initate corrective action to restore the current to that predetermined level. Thus, for example, if the circuit 24 is a welding circuit and the $I_1$ is the welding current flowing through the circuit 24 and through the rod 12, the rod 12 may be of such material proportioned and twisted to yield anisotropy so that when the current $I_1$ is the normal welding current, it will be sufficient to cause irreversible magnetic changes during each half cycle of current. The existence of the irreversible magnetic changes results in a change in direction of the helical flux within the rod 12 and hence a change in the direction of the axial flux component, whereby to cause a change in flux linkages in the coil 26 to thereby induce a voltage $V_o$ across the output terminals 28 and 30 of the coil 26. So long as there is the voltage $V_o$ appearing at the terminals 28 and 30, the mechanism is operating normally. However, if for some reason there is a loss of welding current in the circuit 24, $V_o$ will disappear and its disappearance may be monitored by suitable apparatus (not shown) that is readily designed by the skilled art worker to actuate a mechanism to restore welding. Thus, for example, when $V_o$ disappears, a suitable motor means may be actuated by mechanism not shown in FIG. 1 to move the welding rod closer to the workpiece to restrike the arc and resume normal operation.

Rod 12 may be of any suitable construction, either hollow or solid. It is presently preferred that rod 12 be a composite piece including a central conductive core 34 and an outer coating 36 of material having a high coefficient of magnetostriction. Thus, for example, the core 34 could be made of copper, whereas the outer coating 36 may be made of a nickel-iron alloy. This is particularly desirable in an application where substantial amount of current is to flow through rod 12 as most magnetostrictive materials are not very good conductors. Thus, if the rod 12 were made just of the material exhibiting a high coefficient of magnetostriction, the device 10 may exhibit unnecessarily high $I^2R$ losses to the disadvantage of the device. However, when the core 12 is made of a good current conductor, most or all of the current will flow through the core and yet the benefits of high magnetostriction can be secured by virtue of the coating 36.

As previously noted, the rod 12 exhibits its magnetic uniaxial anisotropy by virtue of it being twisted and being held in a twisted condition by the U-shaped member 18. In this connection, it should be noted that the anisotropy exhibited by the rod 12 is in a direction other than longitudinal or circular. The existence of uniaxial anisotropy in either the circular or longitudinal direction will not cause the device to operate as previously described. The above operation will only occur when the direction of anisotropy is other than the two directions specified, namely circular or longitudinal.

The anisotropy of rod 12 and the other rods to be described hereinafter can be obtained by other than twisting within the elastic limit and holding of the twist as by a U-shaped member 18. Thus, for example, the device can be twisted beyond the elastic limit and then released and uniaxial anisotropy in the desired direction will result. An improvement in the anisotropy yielded by such permanently twisted rods may be improved by cycling the rods back and forth through a number of twists. The reason for this improvement is not fully understood but it has been observed. Still more improvement in the desired anisotropy has been obtained when the material being processed is both twisted and forced through a die at the same time. It is believed that similar results can be achieved by sequential operation, that is a twisting and then a stretching or a stretching and then a twisting as well as a simultaneous twisting and stretching. Other means of achieving magnetic anisotropy are by magnetic annealing which is a process in which the material being treated is heated to a temperature below its curie temperature and then is gradually cooled while being held in a magnetic field. For the rods to be used herein, the direction of the field is preferably helical. Clearly, the magnetic field used during magnetic annealing cannot be either longitudinal or circular as neither such field will yield a satisfactory rod for use in the present invention. Other means of achieving magnetic anisotropy are by either physically removing a portion of the rod or by adding material to the rod. Thus, for example, a helical groove can be machined into the outer surface of the rod and this will result in the rod becoming magnetically anisotropic in the helical direction. Alternatively, an added wire may be wound about the rod in a helical direction and welded thereto to add additional material, and this too will cause a helical magnetic anisotropy.

Irrespective of how the anisotropy is achieved, the device 10 of FIG. 1 will operate as described.

While I have herein shown and described the preferred form of the present invention and I have suggested modifications thereof, other changes and modifications may be made therein within the scope of the appended claims without departing from the spirit and scope of this invention.

I claim:

1. A current sensing device comprising a current conductive rod which exhibits magnetic anisotropy in other than a purely circular or longitudinal direction, a conductive coil wound about said rod, and means for applying an alternating current through said rod which is dependent on the size of the current being sensed, said applied alternating current being of sufficient magnitude to produce a helical magnetization of said rod in a given direction during one half cycle of said current and for reversing the direction of said helical magnetization during the next half cycle of said current, to produce a change in the linkage of axial flux in said rod with said conduction coil to cause an AC output signal at the terminals thereof.

2. The current sensing device of claim 1, wherein said device is a device for sensing the presence of a current above a predetermined value, and wherein said current of said predetermined value is insufficient to effect said reversal of the direction of said helical magnetization, and wherein current of a value above said predetermined value is said alternating current for producing said reversal of direction of helical magnetization, whereby when said last mentioned current flows through said rod, said output signal will appear at the terminals of said conductive coil to indicate an overcurrent condition.

3. The current sensing device of claim 1, wherein said device is a device for sensing the reduction in current below a predetermined value, and wherein said current for reversing the direction of helical magnetization is said current of said predetermined value, and wherein when a current below said predetermined value flows through said rod, said reversal of direction of helical magnetization will not occur, whereby to cause an absence of output signal at the terminals of said conductive coil to indicate an undercurrent condition.

4. The current sensing device of claim 1, further comprising an insulating bobbin slidably disposed on said rod, and wherein said conductive coil is wound on said bobbin.

5. The current sensing device of claim 2, wherein said rod comprises a center core made of highly electrically conductive material and a magnetostrictive coating on said conductive core.

* * * * *